United States Patent [19]

Wakai

[11] Patent Number: 5,202,917
[45] Date of Patent: Apr. 13, 1993

[54] TELEPHONE CALLING METHOD AND TELEPHONE APPARATUS

[75] Inventor: Yoichi Wakai, Saitama, Japan

[73] Assignee: Pioneer Electronic Corporation, Tokyo, Japan

[21] Appl. No.: 774,862

[22] Filed: Oct. 11, 1991

[30] Foreign Application Priority Data

Nov. 15, 1990 [JP] Japan .................................. 2-307099

[51] Int. Cl.[5] ........................ H04M 1/72; H04M 9/00
[52] U.S. Cl. .................................... 379/159; 379/160; 379/164; 379/170; 379/61
[58] Field of Search ............... 379/179, 159, 160, 164, 379/170, 58, 61

[56] References Cited

U.S. PATENT DOCUMENTS 4,754,476  6/1988  Rasmussen et al. ................. 379/159
4,922,526  5/1990  Morganstein et al. .......... 379/164 X Primary Examiner—Stafford Schreyer
Attorney, Agent, or Firm—Sughrue, Mion, Zinn, Macpeak & Seas

[57] ABSTRACT

A person to whom a telephone call is directed is called at an extension either by voice only or by voice during each silent period of an audible ringing signal. A plurality of telephone sets are provided where each telephone set includes a receiver for receiving a telephone call and a called person signal representative of a called person to whom the telephone call is directed. A telephone call and the corresponding called person signal can be transferred to another telephone set by placing the caller on hold and accessing a base unit which transmits the call and the corresponding called person signal to the appropriate portable unit. Each unit in the system includes a voice signal amplifier and an audible ringing signal generating circuit to output the ringing and voice calls through a speaker.

6 Claims, 3 Drawing Sheets

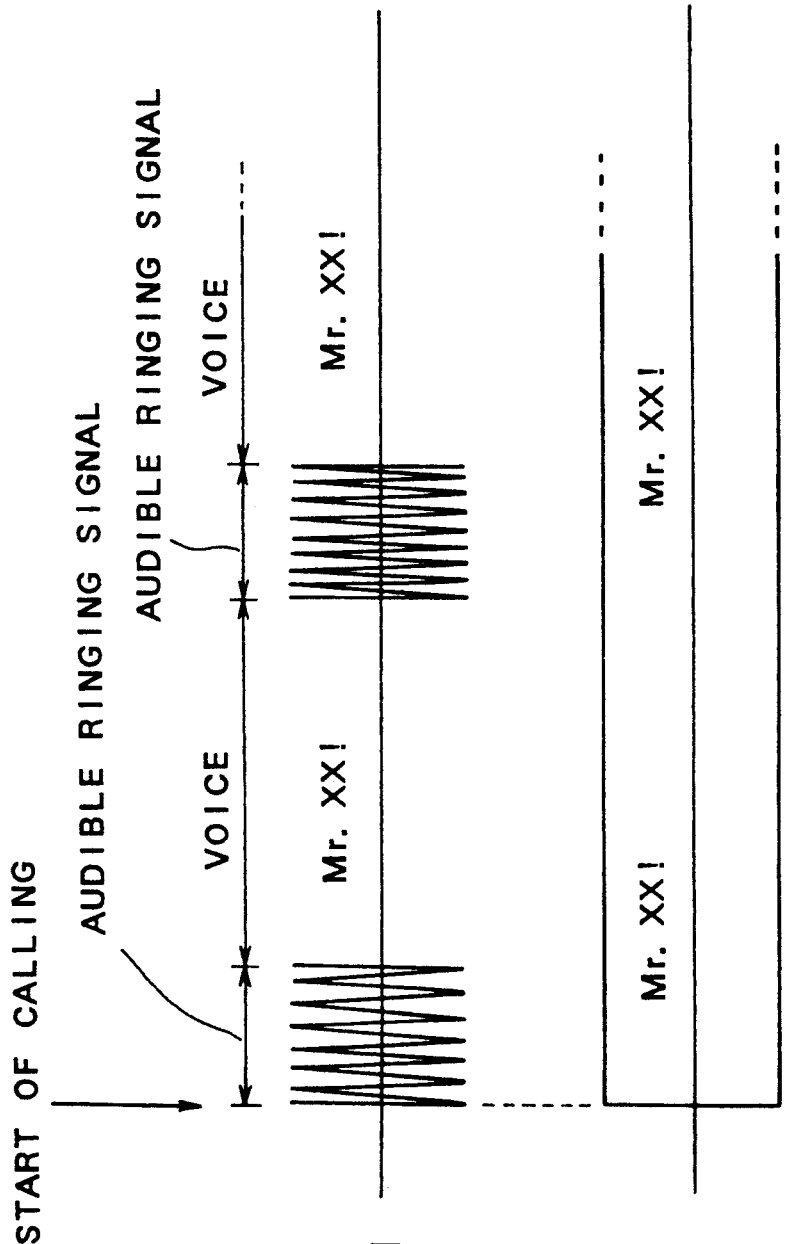

TELEPHONE CALLING METHOD AND TELEPHONE APPARATUS

BACKGROUND OF THE INVENTION

1. Field of the Invention

This invention relates to a telephone apparatus which includes a plurality of extension telephone sets capable of making an extension-to-extension telephone call and also to a telephone calling method for a telephone apparatus of the type mentioned.

2. Description of the Prior Art

Telephone apparatus which include a plurality of extension telephone sets capable of making an extension-to-extension telephone call such as, for example, cordless telephone systems is already known and in practical use. In a telephone apparatus of such type, when a base unit is to be rung from a portable unit or reversely when a portable unit is to be rung from the base unit, an intercommunication ringing signal is transmitted on radio waves from the calling side, and an audible ringing signal generating circuit is activated on the called side in response to reception of the radio waves to develop an audible ringing signal such as a buzzer sound or an audible dial tone to give information of such telephone call.

In telephone apparatus which include a plurality of extension telephone sets capable of making an extension-to-extension telephone call including such cordless telephone sets as described above, it is a common practice to call a called telephone set using an audible ringing signal such as a buzzer sound or an audible dial tone as described above. Accordingly, with conventional telephone apparatus, even if a telephone call is had, it cannot be discriminated to whom the telephone call is directed, and therefore, a person nearest to the rung telephone set is obliged to take and relay the telephone to a person called by the telephone call.

SUMMARY OF THE INVENTION

It is an object of the present invention to provide a telephone calling method and a telephone apparatus wherein, when a telephone call is had, no relay of such telephone call is required.

In order to attain the object, according to an aspect of the present invention, there is provided a telephone calling method for a telephone apparatus which includes a plurality of extension telephone sets capable of making an extension-to-extension telephone call, which comprises the steps of developing an audible ringing signal which sounds intermittently after each predetermined silent period, and calling a called person by voice during each such silent period. Otherwise, a called person may be called only by voice without development of an audible ringing signal.

According to another aspect of the present invention, there is provided a telephone apparatus which comprises a plurality of extension telephone sets, means provided in each of the telephone sets for receiving a telephone call and a called person signal representative of a called person to whom the telephone call is directed, means provided in each of the telephone sets for transferring a received telephone call and a corresponding called person signal to another one of the telephone sets, and means provided in each of the telephone sets for developing voices in accordance with a received called person signal to call a called person of a telephone call.

With the telephone calling method and the telephone apparatus, since a called person is called by voice from a telephone set to which the telephone call is directed, it can be directly known, on the called telephone set side, to whom the telephone call is directed. Accordingly, such cumbersome operation that a person nearest to the rung telephone set is obliged to take and relay the telephone to a person called by the telephone call is unnecessary, and and such person can be called up directly to the telephone set.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 3a and 3b are diagrammatic representations illustrating different manners of calling by voice in accordance with the present invention.

DESCRIPTION OF THE PREFERRED EMBODIMENT

Figure 1:
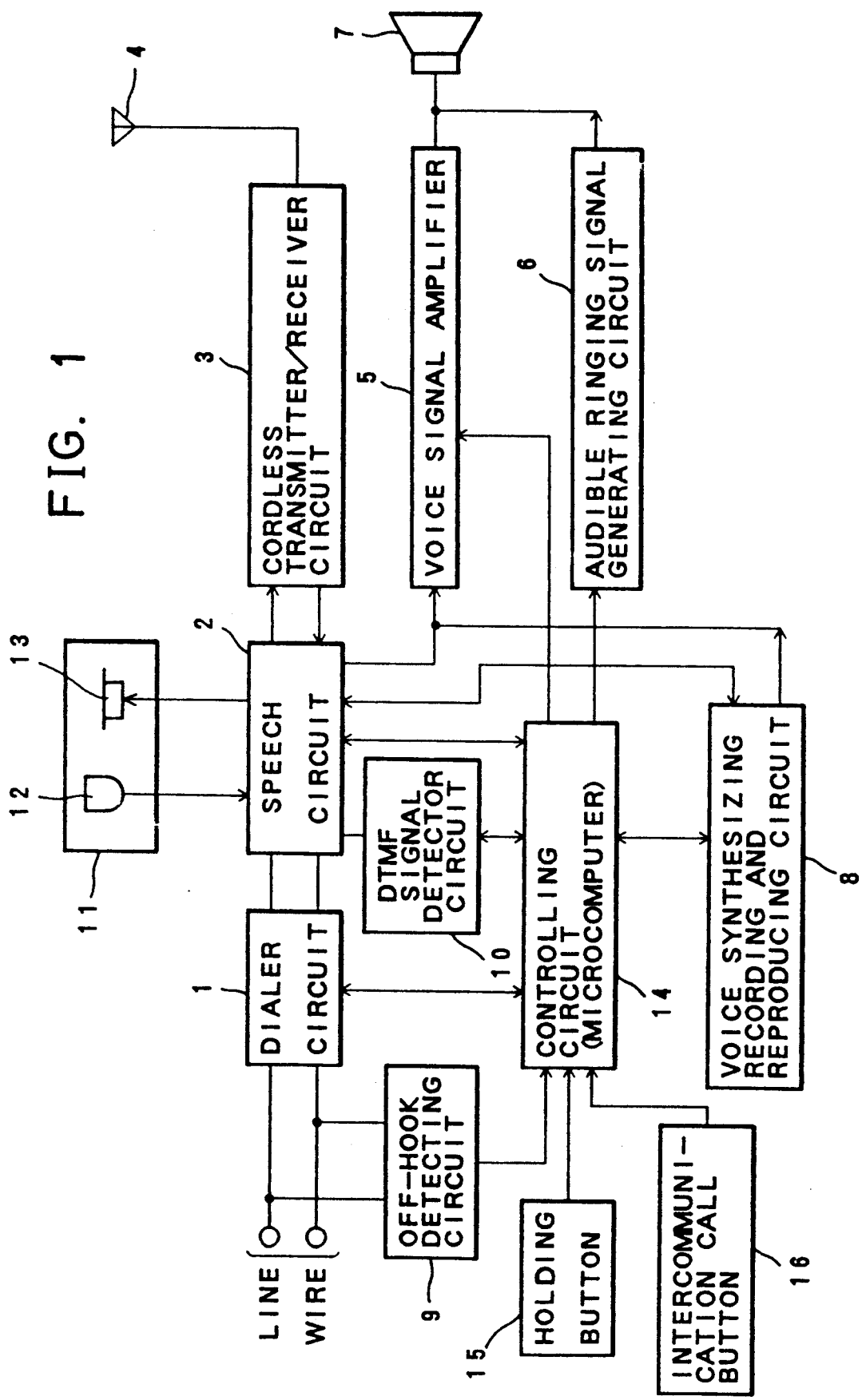
FIG. 1 is a block diagram of a base unit of a cordless telephone system base unit to which the present invention is applied.
Figure 2:
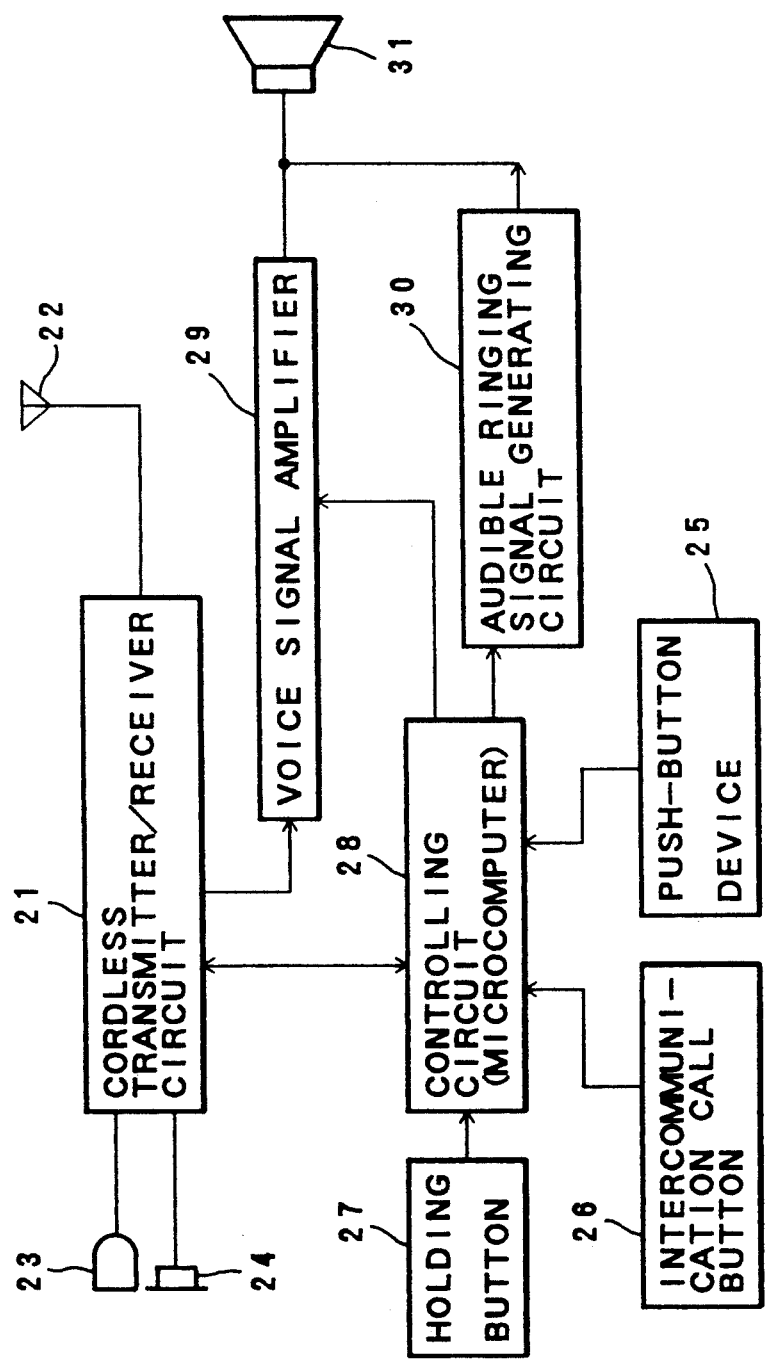
FIG. 2 is a block diagram of a portable unit of the cordless telephone system.

Referring to FIGS. 1 and 2, there are shown a base unit and a portable unit, respectively, of a cordless party telephone apparatus to which the present invention is applied. Referring first to FIG. 1, the base unit shown includes a dialer circuit 1 which may include a plurality of push-buttons not shown as in a conventional telephone set, a speech circuit 2, a cordless transmitter/receiver circuit 3, an antenna 4, a voice signal amplifier 5, an audible ringing signal generating circuit 6, a loudspeaker 7, a voice synthesizing recording and reproducing circuit 8 in which an IC (integrated circuit) memory (not shown) is built in, a handset 11 having a transmitter 12 and a receiver 13, an off-hook detecting circuit 9 for detecting that the handset 11 has been picked up, a DTMF signal detector circuit 10 for receiving a push tone formed from a multi-frequency signal, a controlling circuit 14 which may be a microcomputer or the like, a holding button 15, and an intercommunication call button 16. A line wire or main wire is connected to the parent set of FIG. 1, and the base unit thus serves as a relay transmitter.

Referring now to FIG. 2, the portable unit shown of the cordless telephone system includes a cordless transmitter/receiver circuit 21, an antenna 22, a transmitter 23, a receiver 24, a push-button device 25 for dialing, an intercommunication call button 26, a holding button 27, a controlling circuit 28 which may be a microcomputer or the like, a voice signal amplifier 29, an audible ringing signal generating circuit 30, and a loudspeaker 31. Such portable unit is prepared by one or by a suitable plural number in accordance with the specifications of the telephone apparatus.

Now, various calling methods using the cordless party telephone apparatus of the construction described above will be described.

(1) Intercommunication Calling of Base Unit from Portable Unit

When the intercommunication call button 26 of the portable unit is depressed, the controlling circuit 28 transmits an intercommunication calling signal on radio waves by way of the cordless transmitter/receiver circuit 21 and the antenna 22.

The base unit will receive the radio waves by way of the antenna 4 and transmit the received signal by way of the cordless transmitter/receiver circuit 3 and the speech circuit 2 to the controlling circuit 14, at which the received signal is decoded. When it is decoded and determined that the received signal is an intercommunication calling signal, the controlling circuit 14 activates the audible ringing signal generating circuit 6 so that an audible ringing signal such as a buzzer sound or an audible dial tone is outputted by way of the loudspeaker 7 to give information that it is an intercommunication telephone call.

In accordance with the present invention, calling by voice is performed simultaneously with ringing by such audible ringing signal. In particular, the silent period of the audible ringing signal is set a little longer (for example, 3 to 4 seconds or so) than that of an ordinary audible ringing signal as illustrated in FIG. 3a, and during such silent period of the audible ringing signal, a calling person of the portable unit may call, toward the transmitter 23, a name of the other party the calling person wants to call, like "Mr. XX! Mr. XX!".

The voice signal produced in such a manner as described above is transmitted to the base unit by way of the cordless transmitter/receiver circuit 21 and the antenna 22. In the base unit, the voice signal is received by way of the antenna 4 and sent by way of the cordless transmitter/receiver circuit 3 and the speech circuit 2 to the voice signal amplifier 5, at which the voice signal is amplified. The thus amplified voice signal is broadcast by way of the loudspeaker 7.

Accordingly, on the base unit side which has been rung over the extension line, a name of a called person is broadcast by voice between ring tones which are developed intermittently as seen from FIG. 3a. Consequently, it can be known directly who is called by the telephone call.

If the person whose name has been called picks up the handset 11 and answers the telephone, then this is detected by the off-hook detecting circuit 9. Consequently, the controlling circuit 14 stops the audible ringing signal of the audible ringing signal generating circuit 6, turns the voice signal amplifier 5 off and puts the base unit into a communicating condition. As a result, the base unit and the portable unit are connected to each other and a telephone communication can be performed.

It is to be noted that such a silent period of an audible ringing signal can be discriminated by a ring-back tone sent back to the calling side.

(2) Another Example of Intercommunication Calling of Base Unit from Portable Unit In place of the method (1) described above, the following intercommunication calling can be performed making use of the voice synthesizing recording and reproducing circuit 8 in the base unit.

In particular, a list of called persons are registered as voice data in advance in the IC memory of the voice synthesizing recording and reproducing circuit 8 in the base unit, and after the intercommunication call button 26 of the portable unit is depressed, the push-button device 25 will be operated to transmit an ID code to the base unit. The base unit thus reads out voice data of a called person corresponding to the received ID code from the IC memory and broadcasts a name of the called person corresponding to the voice data by way of the loudspeaker 7 during a silent period of the audible ringing signal.

(3) Intercommunication Ringing of Portable Unit from Base Unit

If the intercommunication call button 16 of the base unit is operated to call the portable unit, then the controlling circuit 14 sends to the portable unit an intercommunication calling signal on radio waves by way of the speech circuit 2, cordless transmitter/receiver circuit 3 and antenna 4.

The portable unit will receive the radio waves by way of the antenna 22 and sends the received signal by way of the cordless transmitter/receiver circuit 21 to the controlling circuit 28, at which the received signal is decoded. If the portable unit determines that the received signal is a calling signal for the portable unit itself, then the controlling circuit 28 activates the audible ringing signal generating circuit 30 and outputs an audible ringing signal such as a buzzer sound or an audible dial tone by way of the loudspeaker 31 to give information that the portable unit is being called.

Upon such calling, the calling person of the base unit will call, towards the transmitter 12 during a silent period of the audible ringing signal, a name of the other party to whom the calling person wants to call. Such voice signal is transmitted to the portable unit by way of the speech circuit 2, cordless transmitter/receiver circuit 3 and antenna 4. In the portable unit, the voice signal is received by way of the antenna 22 and sent by way of the cordless transmitter/receiver circuit 21 to the voice signal amplifier 29, at which the voice signal is amplified. The amplified voice signal is broadcast from the loudspeaker 31. Accordingly, on the portable unit side, a name of a called person is broadcast by voice during a silent period of an audible ringing signal, and consequently, it can be discriminated who is called by the telephone call.

(4) Transfer of Outside Telephone Call Received at Portable Unit to Base Unit The holding button 27 of the portable unit will first be depressed to put the outside telephone call in a holding condition, and then the intercommunication call button 26 will be depressed. Next, calling of a name of a designated called person by voice should be performed to the base unit in a similar manner as in the method of (1) or (2) described hereinabove.

(5) Another Example of Transfer of Outside Telephone Call Received at Portable Unit to Base Unit In place of the method of (4) described above, such calling by voice as described below can be performed making use of the voice synthesizing recording and reproducing circuit 8 in the base unit.

In particular, the holding button 27 of the portable unit will be depressed to put the outside telephone call into a holding condition, and then the intercommunication call button 26 will be depressed to ring the base unit. Then, a name of a called person to whom the outside telephone call is to be transferred will be called by way of the transmitter 23 of the portable unit and transmitted to the base unit. The base unit stores the name of the called person transmitted thereto from the portable unit once into the IC memory in the voice synthesizing recording and reproducing circuit 8.

Then, the push-button device 25 of the portable unit will be operated to transmit a predetermined command code to the base unit to activate the audible ringing signal generating circuit 6 of the base unit. Consequently, an audible ringing signal is produced from the loudspeaker 7, and during a silent period of such audible ringing signal, the name of the called person stored in the IC card is recalled from the voice synthesizing recording and reproducing circuit 8 and broadcast from the loudspeaker 7.

According to the present method, since calling processing by voice can be performed by control of the controlling circuit 14 of the base unit, a calling person on the portable unit side can perform calling by voice without taking any care of a silent period of an audible ringing signal.

(6) Transfer of Outside Telephone Call Received at Base Unit to Portable Unit

The holding button 15 of the base unit will be depressed to put the outside telephone call into a holding condition, and then the intercommunication call button 16 will be depressed to ring the portable unit. Then, calling by voice of the portable unit is performed in a similar manner as in the method of (3) described hereinabove, and when the portable unit answers, the outside telephone call in the holding condition is transferred to the portable unit.

(7) Transfer of Outside Telephone Call between Portable Units

Where the telephone apparatus includes a plurality of portable units, an outside telephone call received at one of the portable units can be transferred to another one of the portable units in the following manner by calling by voice.

In particular, the holding button 27 of one of the portable units at which an outside telephone call has been received will be depressed to put the portable unit into a holding condition, and then a second portable unit to which the outside telephone call is to be transferred is rung. Such ringing signal is received once by the base unit. Then, the calling person of the first portable unit transmits a name of a called person to which the outside telephone call is to be transferred to the base unit in a similar manner as in the method of (5) described hereinabove. The transmitted name of the called person is stored once into the voice synthesizing recording and reproducing circuit 8 in the base unit.

The base unit then transmits a ringing signal to the second portable unit of the transfer destination in accordance with the calling signal for the second portable unit transmitted thereto from the first portable unit of the calling side. Further, the base unit recalls the name of the called person from the IC memory in the voice synthesizing recording and reproducing circuit 8 and transmits the same to the second portable unit during a silent period of the ringing signal. Consequently, the second portable unit of the transfer destination performs calling of the called person by voice between ring tones.

Then, if the called person depresses the intercommunication call button 26 of the second portable unit of the transfer destination to answer the outside telephone call, then the portable unit connects the outside telephone call in the holding condition to the answering second portable unit, thereby completing the transfer operation.

(8) Calling of Extension Telephone Set by Voice from Outside Telephone Set

Where the base unit includes such DTMF signal detector circuit 10 as described hereinabove, calling by voice of an extension telephone set can be performed from an outside telephone set.

In particular, a list of ID codes and corresponding called persons are stored in advance in the IC memory in the voice synthesizing recording and reproducing circuit 8 of the base unit, and after a telephone call is received at the base unit from an outside telephone set, the push-buttons of the outside telephone set will be operated to transmit a desired ID code. The base unit receives such ID code at the DTMF signal detector circuit 10 and decodes it at the controlling circuit 14, and then reads out voice data of a particular called person corresponding to the received ID code from the IC memory in the voice synthesizing recording and reproducing circuit 8. Then, the audible ringing signal generating circuit 6 is activated to develop an audible ringing signal such as a buzzer sound or an audible dial tone, and during a silent period of the audible ringing signal, the name of the called person is broadcast from the loudspeaker 7 by way of the voice signal amplifier 5. In this manner, a particular called person can be called by voice from an outside telephone set.

While the foregoing methods are described in connection with a cordless telephone apparatus, the present invention can be applied not only to a cordless telephone apparatus but also to a wire telephone apparatus in a similar manner only if it includes a plurality of extension telephone sets.

Further, while calling by voice is performed, in the foregoing embodiments, during a silent period of an audible ringing signal which sounds intermittently, only a name of a called person may otherwise be called by voice without using any audible ringing signal, as seen from FIG. 3b.

Having now fully described the invention, it will be apparent to one of ordinary skill in the art that many changes and modifications can be made thereto without departing from the spirit and scope of the invention as set forth herein.

What is claimed is:

1. A telephone calling method for a telephone apparatus which includes a plurality of extension telephone sets capable of making an extension-to-extension telephone call, comprising the steps of developing an audible ringing signal which sounds intermittently after each predetermined silent period, and calling a called person by voice during each such silent period.

2. A telephone calling method for a telephone apparatus which includes a plurality of extension telephone sets capable of making an extension-to-extension telephone call, comprising the steps of:
    calling an extension; and
    calling a called person at said extension only by voice without developing an audible ringing signal.

3. A telephone apparatus, comprising a plurality of extension telephone sets, means provided in each of said telephone sets for receiving a telephone call and a called person signal representative of a called person to whom the telephone call is directed, means provided in each of said telephone sets for transferring a received telephone call and a corresponding called person signal to another one of said telephone sets, and means provided in each of said telephone sets for developing voices in accordance with a received called person signal to call a called person of a telephone call.

4. A telephone apparatus as claimed in claim 3, further comprising means provided in each of said telephone sets for developing, upon reception of a telephone call, an audible ringing signal which sounds intermittently after each predetermined silent period, and controlling means for controlling said voice developing means to develop voices to call a called person of a telephone call during each such silent period.

5. A telephone apparatus as claimed in claim 4, wherein said voice developing means includes a loudspeaker, and said audible ringing signal developing means develops an audible ringing signal by way of said loudspeaker.

6. A telephone apparatus as claimed in claim 3, wherein a predetermined one of said telephone sets is connected to a main line so as to receive an outside telephone call and said voice developing means of the predetermined telephone set has a list of called persons stored therein, and further comprising means provided in the predetermined telephone set for synthesizing, when a called person of an outside telephone call is included in the list of called persons, a voice signal representative of the called person, a synthesized voice signal being transmitted as a called person signal to said voice developing means of the predetermined telephone set or one of the other telephone sets to which a telephone call is directed so as to call a called person of the telephone call.

* * * * *